(12) United States Patent
Zhang et al.

(10) Patent No.: US 10,114,249 B2
(45) Date of Patent: Oct. 30, 2018

(54) LIQUID CRYSTAL DISPLAY PANEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Long Zhang, Xiamen (CN); Shulin Yao, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 67 days.

(21) Appl. No.: 15/014,470

(22) Filed: Feb. 3, 2016

(65) Prior Publication Data
US 2016/0238889 A1    Aug. 18, 2016

(30) Foreign Application Priority Data

Feb. 13, 2015   (CN) .......................... 2015 1 0078173

(51) Int. Cl.
*G02F 1/1335* (2006.01)
*G02F 1/1333* (2006.01)
(Continued)

(52) U.S. Cl.
CPC ...... *G02F 1/133528* (2013.01); *G02F 1/1333* (2013.01); *G02F 1/133707* (2013.01);
(Continued)

(58) Field of Classification Search
CPC ................................................. G02F 1/133528
See application file for complete search history.

(56) References Cited

U.S. PATENT DOCUMENTS

| 3,941,901 A | 3/1976 | Harsch |
| 2008/0151147 A1* | 6/2008 | Weber .................... G02B 5/305 |
| | | 349/96 |

(Continued)

FOREIGN PATENT DOCUMENTS

| CN | 1768293 A | 5/2006 |
| CN | 101056949 A | 10/2007 |

(Continued)

*Primary Examiner* — Edmond Lau
(74) *Attorney, Agent, or Firm* — Anova Law Group, PLLC

(57) ABSTRACT

A display panel and fabrication method is provided. The display panel includes a first transparent substrate, a second transparent substrate, a plurality of sub-regions arranged in a matrix, a first organic film layer formed and a first alignment layer formed on the first transparent substrate, a second organic film layer and a second alignment layer formed on the second transparent substrate, and a liquid crystal layer sandwiched between the first transparent substrate and the second transparent substrate. Further, the plurality of sub-regions arranged in the matrix include at least one first sub-region and at least one second sub-region. The first organic film layer has a first polarization axis in the first sub-region, the second organic film layer has a second polarization axis in the first sub-region, the first polarization axis has an angle α with the second polarization axis, wherein $89° \leq \alpha \leq 91°$.

14 Claims, 10 Drawing Sheets

(51) Int. Cl.
*G02F 1/1337* (2006.01)
*G02F 1/1343* (2006.01)
(52) U.S. Cl.
CPC .............. *G02F 1/134309* (2013.01); *G02F 2001/133357* (2013.01); *G02F 2001/133538* (2013.01); *G02F 2201/40* (2013.01)

(56) References Cited

U.S. PATENT DOCUMENTS

| 2013/0057795 A1* | 3/2013 | Kesho ............... G02F 1/134363 349/43 |
| 2013/0335684 A1* | 12/2013 | Yoshikawa ........... G02F 1/1333 349/96 |
| 2014/0055430 A1* | 2/2014 | Hirosawa .......... G02F 1/134363 345/204 |
| 2015/0036075 A1* | 2/2015 | Li ..................... G02F 1/133504 349/61 |

FOREIGN PATENT DOCUMENTS

| CN | 104160326 A | 11/2014 |
| CN | 104570459 A | 4/2015 |

\* cited by examiner

LIQUID CRYSTAL DISPLAY PANEL AND FABRICATION METHOD THEREOF

CROSS-REFERENCES TO RELATED APPLICATIONS

This application claims the priority of Chinese patent application No. 201510078173. X, filed on Feb. 13, 2015, the entire content of which is incorporated herein by reference.

FIELD OF THE DISCLOSURE

The present disclosure relates to the field of display technology and, more particularly, relates to a liquid crystal display (LCD) panel and related fabrication techniques.

BACKGROUND

In recent years, flat panel displays have been widely used in a variety of fields because of their light weight and high energy efficiency, and liquid crystal display (LCDs) are the most common among them. A typical LCD panel consists of an array substrate, a color film substrate, and a liquid crystal layer sandwiched between the array substrate and the color film substrate. At least one substrate is deposited with pixel electrodes and common electrodes. Applying a voltage between the pixel electrodes and the common electrodes generates an electric field. The orientation of liquid crystal molecules can be controlled by controlling the change in the electric field intensity and, in this way, the backlight transmittance of each pixel is modulated to display images.

LCDs are mainly divided into two categories according to the operating principle of the liquid crystals: (1) vertical-electric-field-mode LCDs, such as Twisted Nematic (TN) and Multi-domain Vertical Alignment (MVA), etc., where the electric field perpendicular to the substrates is used to drive the liquid crystal layer, and the incident light into the liquid crystal layer can be modulated to realize display; (2) horizontal-electric-field-mode LCDs, such as In-plane Switching (IPS) and Fringe Field Switching (FFS), etc., where the electric field parallel to the substrates is used to drive the liquid crystal layer, and the incident light into the liquid crystal layer can be modulated to realize display.

When being viewed by a user, the horizontal-electric-field-mode LCDs have advantages of small color shift, high color reproduction, fast response, high contrast and wide viewing angle, etc., and are more and more widely used in practical applications. As LCD technologies advance, single-domain, double-domain and multi-domain modes have been further developed for horizontal-electric-field-mode LCDs to display images. Compared to the single-domain mode, the double-domain mode and the multi-domain mode exhibit a wider viewing angle.

The horizontal-electric-field-mode LCDs in the double-domain mode or the multi-domain mode usually adopt stripe-shaped electrodes with different extending directions to generate an electric field with different directions, causing liquid crystal molecules to rotate along different directions. However, such LCDs often require attaching polarizers subsequently to control the light transmittance. Due to the process variation in manufacturing, the angles between the optical axis of the polarizers and the stripe-shaped electrodes can vary slightly in different domains. As a result, the light transmittance in each domain may be different, causing uneven or striped image display.

The disclosed LCD display panel and fabrication method are directed to solve one or more problems set forth above and other problems.

BRIEF SUMMARY OF THE DISCLOSURE

One aspect of the present disclosure provides a LCD panel. The display panel includes a first transparent substrate, a second transparent substrate, a plurality of sub-regions arranged in a matrix, a first organic film layer and a first alignment layer formed on the first transparent substrate, a second organic film layer and a second alignment layer formed on the second transparent substrate, and a liquid crystal layer sandwiched between the first transparent substrate and the second transparent substrate. Further, the plurality of sub-regions arranged in the matrix include at least one first sub-region and at least one second sub-region. The first organic film layer has a first polarization axis in the first sub-region, the second organic film layer has a second polarization axis in the first sub-region, the first polarization axis has an angle α with the second polarization axis, wherein $89°≤α≤91°$.

Another aspect of the present disclosure provides a fabrication method of the LCD panel. The method includes providing a first transparent substrate and a second transparent substrate opposite to the first transparent substrate, defining a plurality of sub-regions arranged in a matrix; forming a first organic film layer and a first alignment layer on the first transparent substrate; forming a second organic film layer and a second alignment layer on the second transparent substrate; and disposing a liquid crystal layer between the first transparent substrate and the second transparent substrate. Further, the first alignment layer on the first transparent substrate is facing the second alignment layer on the second transparent substrate. The plurality of sub-regions arranged in the matrix include at least one first sub-region and at least one second sub-region. The first organic film layer has a first polarization axis in the first sub-regions, and the second organic film layer has a second polarization axis in the first sub-regions. The first polarization axis has an angle α with the second polarization axis, $89°≤α≤91°$.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1A:
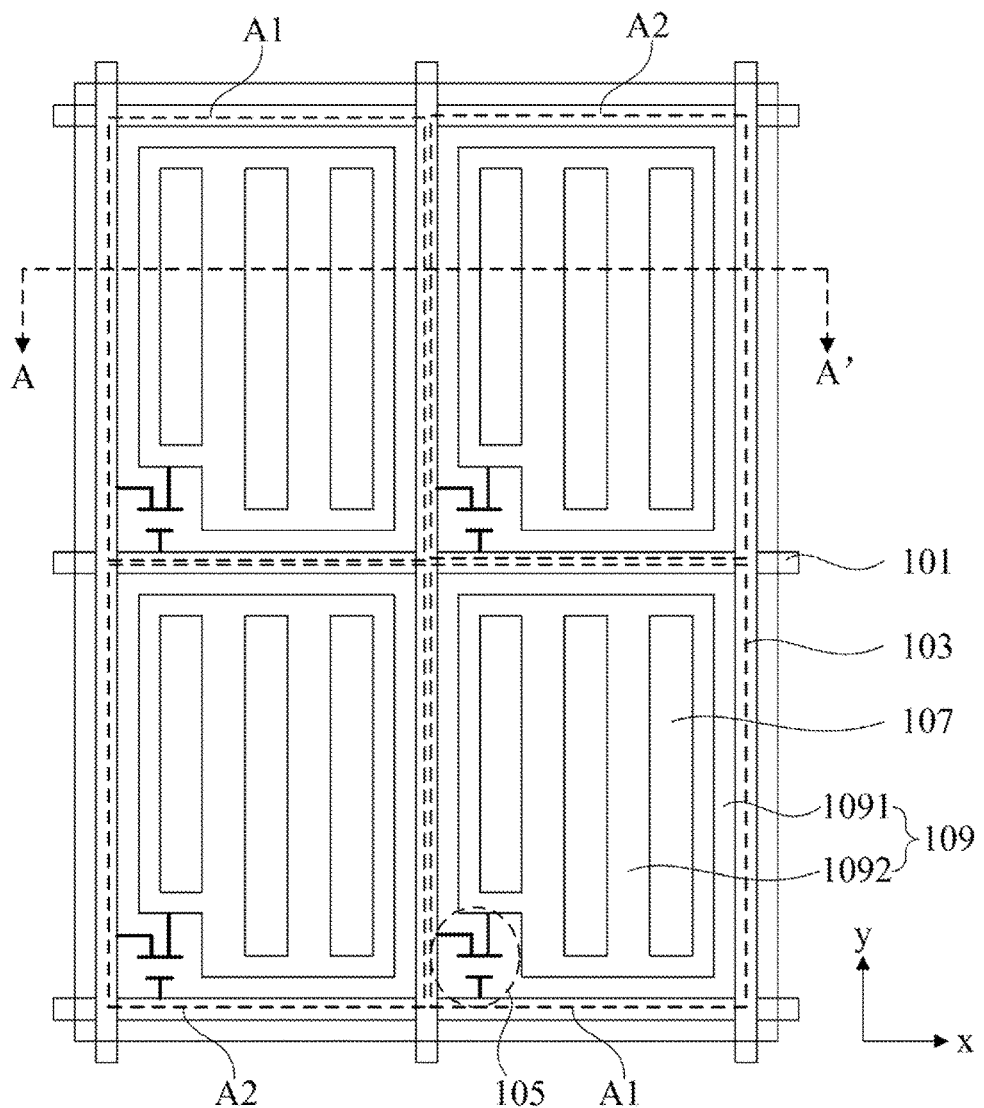
FIG. 1a illustrates a top view of an exemplary LCD panel consistent with disclosed embodiments.
Figure 1B:
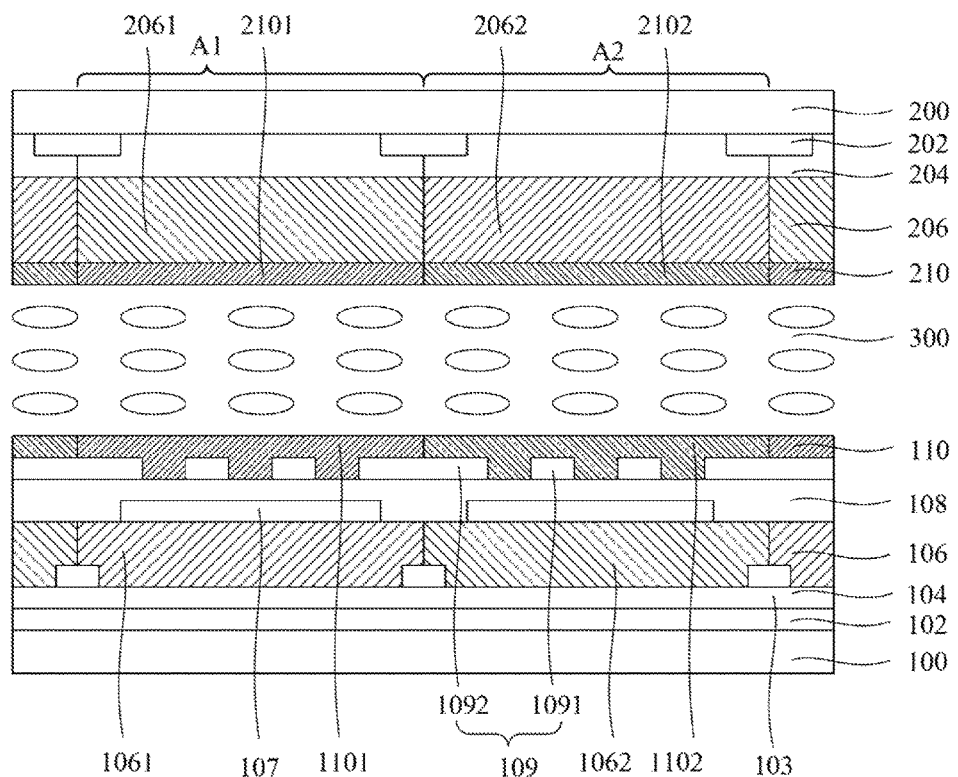
FIG. 1b illustrates a AA' sectional view of an exemplary LCD panel in FIG. 1a consistent with disclosed embodiments.
Figure 1C:
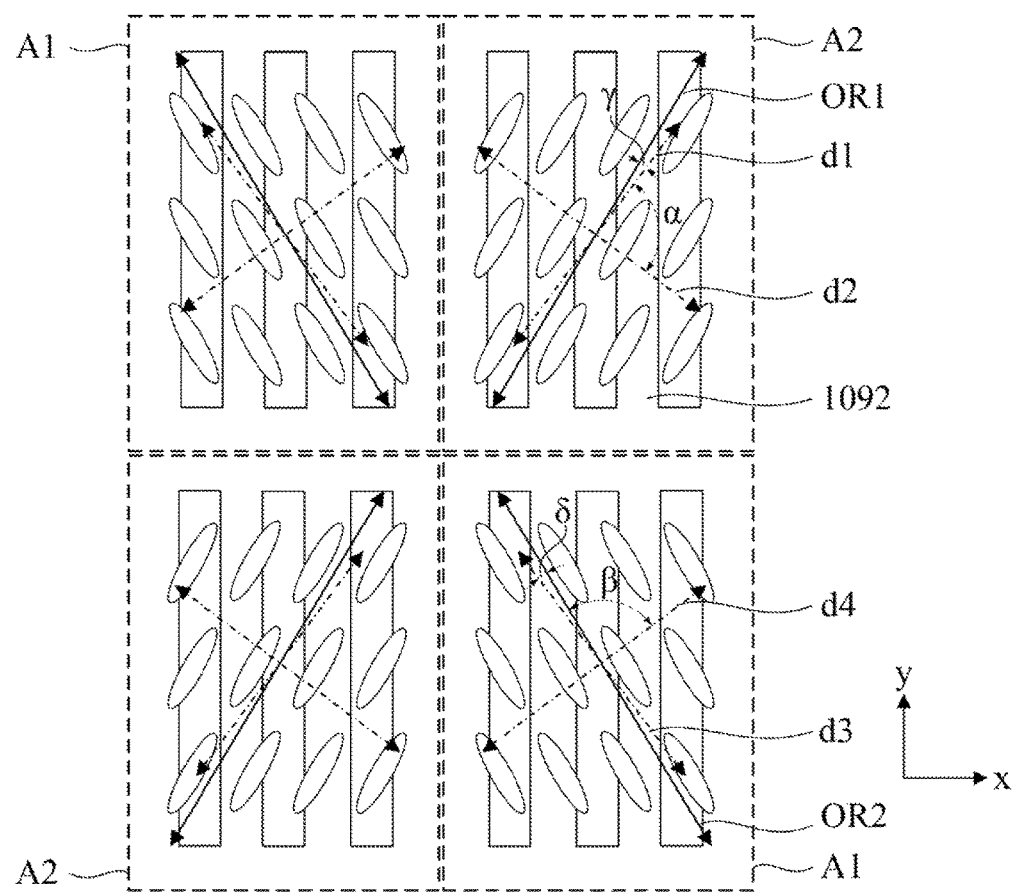
FIG. 1c illustrates an alignment direction and a polarization axis of an organic film layer in an exemplary LCD panel in FIG. 1a consistent with disclosed embodiments.

FIG. 1a illustrates a cross-sectional view of an exemplary LCD panel consistent with the disclosed embodiments. FIG. 1b illustrates an AA' sectional view of an exemplary LCD panel in FIG. 1a, and FIG. 1c illustrates an alignment direction and polarization axis of an organic film layer in an exemplary LCD panel in FIG. 1a.

As shown in FIG. 1a and FIG. 1b, the LCD panel includes a first transparent substrate 100 and a second transparent substrate 200 arranged opposite to the first transparent substrate 100. For example, each of the first transparent substrate 100 and the second transparent substrate 200 has an inner surface and an outer surface. The inner surface of the first transparent substrate 100 is placed opposite to that of the second transparent substrate 200.

The LCD panel also includes a plurality of scanning lines 101 and a plurality of data lines 103 formed on the first transparent substrate 100. The scanning lines 101 and the data lines 103 are perpendicular to each other in their extending directions. In the disclosed embodiments, the extending directions of the scanning lines 101 and the data lines 103 are defined as a first direction x and a second direction y, respectively. The first direction x is perpendicular to the second direction y. The scanning lines 101 intersect or cross with the data lines 103, defining a plurality of pixel regions or pixels. FIG. 1a illustrates four adjacent pixels arranged in a 2×2 matrix (A1, A2, A2, A1).

Further, the first transparent substrate 100 may also include pixel electrodes 107 and common electrodes 109, and the pixel electrodes 107 may be formed in each pixel region. A common electrode 109 may further comprise a first common electrode 1091 and a second common electrode 1092. And the second common electrode 1092 may include stripe-shaped electrodes within the pixel region.

A switching element 105 is placed close to the intersection of a scanning line 101 and a data line 103. Particularly, the switching element 105 comprises a semiconductor layer, a gate, a source and a drain. The gate is electrically connected to the corresponding scanning line 101, the source is electrically connected to the corresponding data line 103, and the drain is electrically connected to the corresponding pixel electrode 107.

In the disclosed embodiments, the pixel electrode 107 is placed closer to the first transparent substrate 100 than the common electrode 109. However, in certain other embodiments, the common electrode 109 may be placed closer to the first transparent substrate 100 than the pixel electrode 107, and the pixel electrode 107 may include multiple stripe-shaped electrodes. In addition, both the common electrodes and the pixel electrodes may be formed on a same insulating layer, and both may include multiple stripe-shaped electrodes.

As shown in FIG. 1b, a first insulating layer 102 may be formed on the first transparent substrate 100. The first insulating layer 102 may include a gate-insulating layer. The first insulating layer 102 may be located between the layer containing the scanning lines 101 and the semiconductor layer.

Further, a second insulating layer 104 may be formed on the first insulating layer 102. The second insulating layer 104 may be a dielectric layer located between the layer containing scanning lines 101 and the layer containing data lines 103 to insulate the scanning lines 101 and the data lines 103. Further, a first organic film layer 106 may be formed on the second insulating layer 104. The first organic film layer 106 may be made of a polymer (e.g. polyimide) doped with dichroic organic dyes, and the first organic film layer 106 may be located between the layer containing the data lines 103 and the layer containing pixel electrodes 107 layer to, for example, reduce the thickness variation of the first insulting layer 102 and the second insulating layer 104, i.e., a planarization layer.

Further, a third insulating layer 108 may be formed on the first organic film layer 106, and the third insulating layer 108 may be located between the layer containing pixel electrodes 107 and the layer containing common electrodes 109. A first alignment layer 110 may be formed on the surface of the first transparent substrate 100 facing the second transparent substrate 200.

As shown in FIG. 1b, the second transparent substrate 200 may include a light shielding layer 202, a color filtering layer 204, a second organic film layer 206, and a second alignment layer 210. Other layers may also be included.

The light shielding layer 202 may be formed on the second transparent substrate 200. The light shielding layer 202 may be a black matrix covering non-display regions on the first transparent substrate 100. The color filtering layer 204 may be formed on the second transparent substrate 200 and on the light shielding layer 202. The color filtering layer 204 may include multiple color filters for different colors and the color filters correspond to different pixel regions on the first transparent substrate 100.

Further, the second organic film layer 206 may be formed on the second transparent substrate 200 and the color filtering layer 204. The second organic film layer 206 may be made of a polymer (e.g. polyimide) doped with dichroic organic dyes, and the second organic film layer 206 may reduce the thickness variation of the light shielding layer 202 and the color filtering layer 204. The second alignment layer 210 may be formed on the surface of the second transparent substrate 200 facing the first transparent substrate 100.

In certain above embodiments, the first organic film layer 106 and the second organic film layer 206 may be made of polyimide doped with dichroic organic dyes. However, in certain other embodiments, the first organic film and the second organic film may be made of other polymers doped with dichroic organic dyes. For example, the polymer in certain other embodiments may be one of azo-polymer, cinnamoyl derivatives, polyimide, and etc. The polymer precursors are photo-sensitive, when exposed under a polarized light, the formed polymer may be aligned in a certain direction after polymerization.

Further, the dichroic organic dye may be an azo dye with an extinction ratio larger than 7. An azo dye molecular may have a different light absorption in the long axis and the short axis, and exhibits a different color. The light absorption ratio between the long-axis and the short-axis may be larger than 7.

During the polymerization, the polyimide in the first organic film layer and the second organic film layer may be gradually aligned along a certain direction, introducing the azo dye molecules to align in the same direction. As a result, the first organic film layer and the second organic film layer may have a different light absorption and transmission in different directions. Therefore, the transmitted light may become polarized, and the polarization direction of the polarized light is the polarization axis of the organic film layer.

In this way, the first organic film layer and the second organic film layer may exhibit a polarization effect, without the need for an additional polarizer, and reduce the polarizer thickness because a TAC (triacetyl cellulose) protection layer and an adhesive layer are no longer needed. Because stretching is not required to enable the polarization effect, the possibility of warpage may be reduced and the reliability may be improved.

In the disclosed embodiments, azo dyes are merely examples for illustrative purposes and are not intended to limit the scope of the present disclosure. In certain other embodiments, one or more dichroic dyes with an extinction ration larger than 7 may be used, such as azo dyes, anthraquinone dyes, biphenyl dyes, triphenyl-dioxazine dyes and derivatives, single and multi-methine dyes, polycyclic dyes and etc.

Further, in the disclosed embodiments, the first organic film layer 106 may be disposed between the first transparent substrate 100 and the first alignment layer 110, functioning as a polarization film and a flattening or planarization film. In certain other embodiments, the first organic film layer may be located on the outer surface of the first transparent substrate, only functioning as a polarization film.

Similarly, in the disclosed embodiments, the second organic film layer 206 may be located between the second transparent substrate 200 and the second alignment layer 210, functioning as a polarization film and flattening film or planarization film. In certain other embodiments, the second organic film layer may be located on the outer surface of the second transparent substrate, only functioning g as a polarization film.

As shown in FIG. 1b, in the disclosed embodiment, a liquid crystal layer 300 may be sandwiched between the first transparent substrate 100 and the second transparent substrate 200. Meanwhile, the liquid crystal layer 300 may be sandwiched between the first alignment layer 110 and the second alignment layer 210. In the disclosed embodiments, the liquid crystal layer 300 may include liquid crystal molecules having a positive dielectric anisotropy.

As shown in FIGS. 1a-1c, the LCD panel may contain a plurality of sub-regions arranged in a matrix. Row direction of the matrix may extend along the first direction x and column direction of the matrix may extend along the second direction y. The plurality of sub-regions may comprise first sub-regions A1 and second sub-regions A2. The first sub-regions A1 and the second sub-regions A2 may be located in different pixel regions and every pixel region may only have the first sub-region A1 or the second sub-region A2.

Further, the first sub-regions A1 and the second sub-regions A2 may be alternately arranged in the row direction of the matrix and the column direction of the matrix respectively. That is, the first sub-regions A1 and the second sub-regions A2 may be alternately arranged in the first direction x and in the second direction y respectively. The first sub-regions A1 and the second sub-regions A2 may alternate over a period of one sub-region. In the LCD panel, the number of the first sub-regions A1 may be equal to the number of the second sub-regions A2.

FIG. 1a shows four pixel regions arranged in a 2×2 matrix. One first sub-region A1 and one second sub-region A2 may alternately arranged along the first direction x, meanwhile, one first sub-region A1 and one second sub-region A2 may alternately arranged along the second direction y. Further, the stripe-shaped electrodes 1092 in the first sub-region A1 and the stripe-shaped electrodes 1092 in the second sub-region A2 may extend along the column direction of the matrix, i.e., the second direction y.

Because the stripe-shaped electrodes 1092 in the first sub-regions A1 and the stripe-shaped electrodes 1092 in the second sub-regions A2 extend along the same direction, when any alignment mismatch between the first transparent substrate 100 and the second transparent substrate 200 occurs, the aperture ratio of the first sub-region A1 and the second sub-region A2 may only be slightly affected. Therefore, the aperture ratio of the LCD panel is improved.

In certain other embodiments, the stripe-shaped electrodes in the first sub-region and the stripe-shaped electrodes in the second sub-region may be symmetrical in the row direction of the matrix or the column direction of the matrix. The LCD panel with a symmetrical design may generate an electric field having different directions and the viewing angle may be improved.

As shown in FIG. 1b and FIG. 1c, in the disclosed embodiments, the first organic film layer 106 may include a region 1061 in the first sub-region A1, which may have a first polarization axis d1. The second organic film layer 206 may include a region 2061 in the first sub-region A1, which may have a second polarization axis d2. The first polarization axis d1 may be perpendicular to the second polarization axis d2. Angle between the first polarization axis d1 and the second polarization axis d2 is α, particularly, α=90°.

The first organic film layer 106 may include a region 1062 in the second sub-region A2, which may have a third polarization axis d3. The second organic film layer 206 may include a region 2062 in the second sub-region A2, which may have a fourth polarization axis d4. The third polarization axis d3 may be perpendicular to the fourth polarization axis d4. Angle between the third polarization axis d3 and the fourth polarization axis d4 is β, particularly, β=90°.

Further, the first alignment layer 110 may include a region 1101 in the first sub-region A1, which may have a first alignment direction OR1. The second alignment layer 210 may include a region 2101 in the first sub-region A1, which may have a first alignment direction OR1. The first alignment direction OR1 may be parallel to the first polarization axis d1. Angle between the first alignment OR1 and the first polarization axis d1 is γ, particularly, γ=0°.

Further, the first alignment layer 110 may include a region 1102 in the second sub-region A2, which may have a second alignment direction OR2. The second alignment layer 210 may include a region 2102 in the second sub-region A2, which may have a second alignment direction OR2. The second alignment direction OR2 may be parallel to the third polarization axis d3. Angle between the second alignment OR2 and the third polarization axis d3 is δ, particularly, δ=0°.

In the LCD panel consistent with the disclosed embodiments, the alignment direction of the alignment layer in the first sub-regions may be different from the alignment direction of the alignment layer in the second sub-regions. And the polarization axis of the organic film layer in the first sub-regions may be different from the polarization axis of the organic film layer in the second sub-regions. At different viewing angles, images compensated by the first sub-regions A1 and the second sub-regions A2 may be observed. The viewing angles may be compensated in different directions without the limitation of the electrode shape and the viewing angles may be widened.

Further, since the first sub-regions A1 and the second sub-regions A2 may be alternately arranged along the row direction of the matrix and the column direction of the matrix respectively, when viewing at the row direction of the matrix (i.e. the first direction x) or the column direction of the matrix (i.e. the second direction y), a compensation of viewing angle and brightness from the first direction x and the second direction y may be obtained. More uniform images may be obtained and the image quality may be improved.

In certain other embodiments, at least one first sub-region A1 and at least one second sub-region A2 may be alternately arranged in the row direction of the matrix and the column direction of the matrix. For example, two first sub-regions A1 and two second sub-regions A2 may be alternately arranged in the row direction of the matrix and the column direction of the matrix respectively. The interval of the first sub-region A1 and the second sub-region A2 in the row direction and (or) the column direction of the matrix may be unequal.

Because the LCD panel with such structure may have two alignment directions and the corresponding polarization axes in the row direction and the column direction, viewing angle and brightness may be compensated in different viewing angles. More uniform images may then be obtained and the image quality may be improved. In addition, the number of the first sub-region A1 and the number of the second sub-region A2 may be equal or not. If equal, the LCD panel may have a uniform viewing angle; if not, the LCD panel may be designed to show warm colors or cold colors when combined with different color filters.

It should be noted that, the disclosed embodiments are only for illustrative purposes. In certain other embodiments, it may be possible to for an LCD panel to have 89°≤α≤91°, 89°≤β≤91°, −1°≤γ≤1° and −1°≤δ≤1°, approximately. Therefore, the first polarization axis d1 may be approximately perpendicular to the second polarization axis d2, the first alignment direction OR1 may be approximately parallel to the first polarization axis d1, the third polarization axis d3 may be approximately perpendicular to the fourth polarization axis d4, and the second alignment direction OR2 may be approximately parallel to the third polarization axis d3. Light leakage in a dark state may be avoided.

In the disclosed embodiments, the first alignment direction OR1 may be parallel to the first polarization axis d1. In certain other embodiments, the first alignment direction OR1 may also be approximately parallel to the second polarization axis d2, i.e. the angle γ between the first alignment direction OR1 and the first polarization axis d1 or the second polarization axis d2 may be −1°≤γ≤1°. Similarly, the second alignment direction may be parallel to the third polarization axis d3. In certain other embodiments, the second alignment direction OR2 may be approximately parallel to the fourth polarization axis d4, i.e. the angle δ between the second alignment direction OR2 and the third polarization axis d3 or the fourth polarization axis d4 may be −1°≤δ≤1°.

As shown in FIG. 1c, in the LCD panel consistent with disclosed embodiments, the first alignment direction OR1 and the second alignment direction OR2 may be symmetric with respect to the row direction of the matrix and the column direction of the matrix, i.e., the first alignment direction OR1 and the second alignment direction OR2 may be symmetric with respect to the first direction x and the second direction y respectively. As a result, the LCD panel with this structure may have a symmetric viewing angle and good image quality.

Further, in certain other embodiments, the first alignment direction OR1 and the second alignment direction OR2 may be asymmetric with respect to the first direction x. In the asymmetric structure, the stripe-shaped electrodes may be set to be asymmetric with respect to the first direction x, the angle between the first alignment direction OR1 and the stripe-shaped electrodes in the first sub-regions A1 may be the same as the angle between the second alignment OR2 and the stripe-shaped electrodes in the second sub-regions A2. Under a same driving voltage, liquid crystal molecules in the first sub-regions A1 and the second sub-regions A2 may be rotated by a same angle, and may not result a non-uniform image. In the LCD panel with an asymmetric design, the viewing angle may be compensated in different viewing directions, in order to meet various requirements of the viewing angle.

It should be noted that, in the disclosed embodiments, positive liquid crystal molecules, i.e., liquid crystal molecules having a positive dielectric anisotropy, are merely examples for illustrative purposes. When positive liquid crystal molecules are used in the LCD panel, an angle between the first alignment direction OR1/second alignment direction OR2 and the stripe-shaped electrodes may be smaller than 45°. Applying a voltage to the pixel electrodes and the common electrodes respectively, an electric field approximately perpendicular to the extending direction of the stripe-shaped electrodes may be generated. The positive liquid crystal molecules may rotate along the electric field direction. If the angle between the alignment direction and the stripe-shaped electrode is smaller than 45°, during the rotation of the positive liquid crystal molecules, a highest brightness state may be achieved and a high contrast ratio may be obtained.

In certain other embodiments, negative liquid crystal molecules, i.e., liquid crystal molecules having a negative dielectric anisotropy, may be used in the LCD panel. An angle between the first alignment direction/second alignment direction and the extending direction of the stripe-shaped electrode may be set to be larger than 45°. During the rotation of the negative liquid crystal molecules, a highest brightness state may be achieved and a high contrast ratio may be obtained.

The alignment direction of the alignment layer in the first sub-region may be different from the alignment direction of the alignment layer in the second sub-region. And the polarization axis of the organic film layer in the first sub-region may be different from the polarization axis of the organic film layer in the second sub-region. The viewing angles may be compensated in different directions without the limitation of the electrode shape, and the transmittance of the LCD panel may be increased.

Further, the first sub-regions and the second sub-regions may be alternately arranged along the row direction of the matrix and the column direction of the matrix respectively. The viewing angle and brightness may be compensated in the row direction of the matrix and the column direction of the matrix respectively. More uniform images may be obtained and the image quality may be improved. Due to the polarization effect of the organic film layer, polarizers may be removed and the thickness of the LCD panel may be reduced. Since a same photomask and grating are employed in the fabrication of the alignment layers and the organic film layers, the fabrication process may be simplified without any extra cost.

Figure 2A:
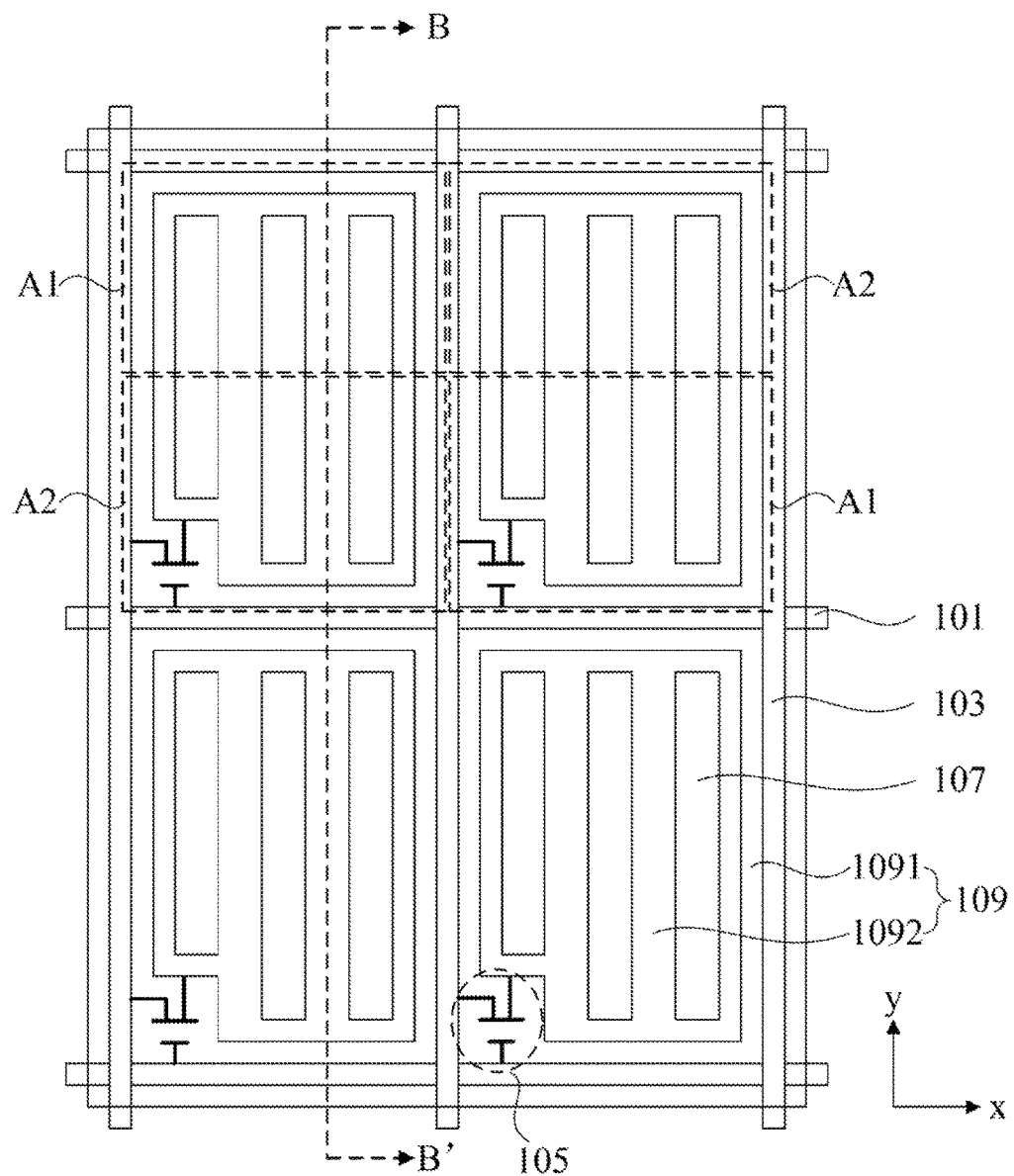
FIG. 2a illustrates a top view of another exemplary LCD panel consistent with disclosed embodiments.
Figure 2B:
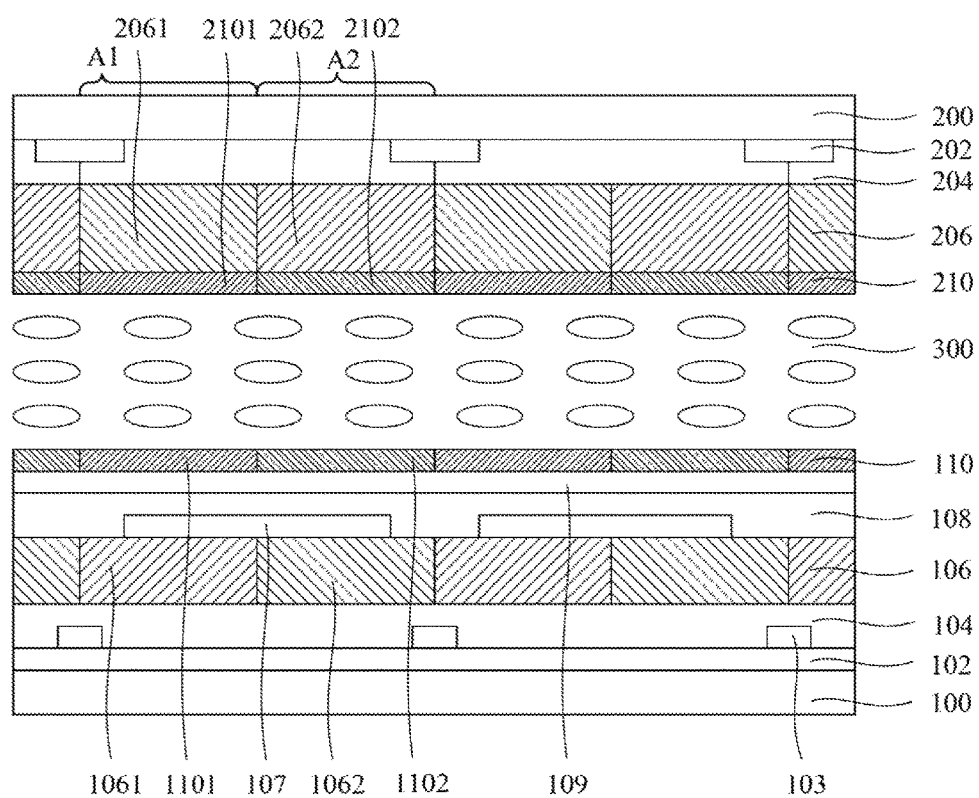
FIG. 2b illustrates a BB' sectional view of another exemplary LCD panel in FIG. 2a consistent with disclosed embodiments.
Figure 2C:
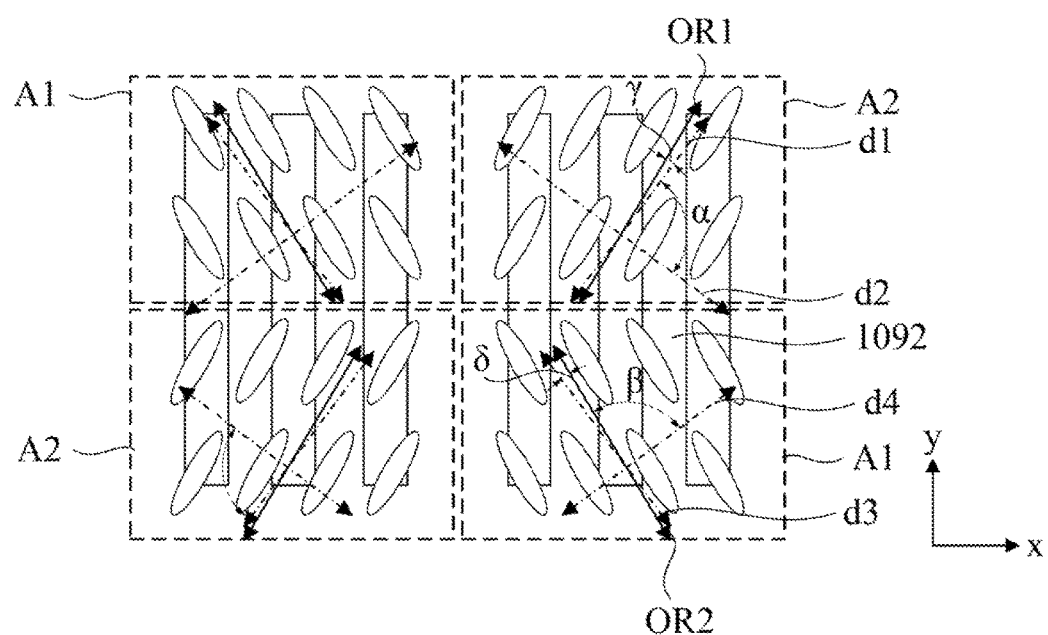
FIG. 2c illustrates an alignment direction and a polarization axis of an organic film layer in an exemplary LCD panel in FIG. 2a consistent with disclosed embodiments.

FIG. 2a illustrates a cross-sectional view of another exemplary LCD panel consistent with the disclosed embodiments. FIG. 2b illustrates a BB' sectional view of another exemplary LCD panel in FIG. 2a consistent with disclosed embodiments. FIG. 2c illustrates the alignment direction and polarization axis of the organic film layer in an exemplary LCD panel consistent with the disclosed embodiments in FIG. 2a. The LCD panel shown in FIG. 2a-2c has a similar structure as illustrated in the previous embodiments shown in FIG. 1a~1c, details of which may be omitted and certain differences may be illustrated below in details.

As shown in FIG. 2a and FIG. 2b, an LCD panel consistent with the disclosed embodiment may include a plurality of scanning lines 101 and a plurality of data lines 103 formed on a first transparent substrate 100. The scanning lines 101 and the data lines 103 are perpendicular to each other in their extending directions. The extending directions of the scanning lines 101 and the data lines 103 are defined as a first direction x and a second direction y, respectively. The first direction x is perpendicular to the second direction y. The scanning lines 101 intersect or cross with the data lines 103, defining a plurality of pixel regions or pixels. FIG. 2a illustrates four adjacent pixels arranged in a 2×2 matrix (A1, A2, A2, A1).

Further, the first transparent substrate 100 may also include pixel electrodes 107 and common electrodes 109, and the pixel electrodes 107 may be formed in each pixel region. A common electrode 109 may further comprise a first common electrode 1091 and a second common electrode 1092. And the second common electrode 1092 may include stripe-shaped electrodes within the pixel region. A switching element 105 is placed close to the intersection of a scanning line 101 and a data line 103.

As shown in FIG. 2b, the first transparent substrate 100 may further include a first insulating layer 102, a second insulating layer 104, a first organic film layer 106 and a first alignment layer 110. The first organic film layer 106 may be made of a polymer (e.g. polyimide) doped with dichroic organic dyes, and the first organic film layer 106 may reduce the thickness variation of the first insulating layer 102 and the second insulating layer 104.

Further, a second transparent substrate 200 may include a light shielding layer 202, a color filtering layer 204, a second organic film layer 206 and a second alignment layer 210. The second organic film layer 206 may reduce the thickness variation of the light shielding layer 202 and the color filtering layer 204, i.e., a planarization layer.

As shown in FIGS. 2a-2c, the LCD panel may include a plurality of sub-regions arranged in a matrix. Row direction of the matrix may extend along the first direction x and column direction of the matrix may extend along the second direction y. The plurality of sub-regions may comprise first sub-regions A1 and second sub-regions A2. One pixel region may comprise the first sub-regions A1 and the second sub-regions A2, i.e., the first sub-regions A1 and the second sub-regions A2 may be located in a same pixel region. Further, in the same pixel region, the first sub-regions A1 and the second sub-regions A2 may be alternately arranged in the column direction of the matrix.

Further, the first sub-regions A1 and the second sub-regions A2 may be alternately arranged in the row direction of the matrix and the column direction of the matrix respectively, that is, the first sub-regions A1 and the second sub-regions A2 may be alternately arranged in the first direction x and the second direction y respectively. The first sub-regions A1 and the second sub-regions A2 may alternate over a period of one sub-region. In the LCD panel, the number of the first sub-regions A1 may be equal to the number of the second sub-regions A2.

FIG. 2a shows four pixel regions arranged in a 2×2 matrix. The four pixel regions may include the first sub-regions A1 and the second sub-regions A2 arranged in 2×4 matrix. One first sub-region A1 and one second sub-region A2 may alternately arranged along the first direction x, meanwhile, one first sub-region A1 and one second sub-region A2 may alternately arranged along the second direction y.

Further, in the disclosed embodiment, the stripe-shaped electrodes 1092 in the first sub-region A1 and the stripe-shaped electrodes 1092 in the second sub-region A2 may extend along the column direction of the matrix, i.e., the second direction y. Because the stripe-shaped electrodes 1092 in the first sub-regions A1 and the stripe-shaped electrodes 1092 in the second sub-regions A2 extend along the same direction, when any alignment mismatch between the first transparent substrate 100 and the second transparent substrate 200 occurs, the aperture ratio of the first sub-region A1 and the second sub-region A2 may only be slightly affected. Therefore, the aperture ratio of the LCD panel may be improved.

It should be noted that, in the disclosed embodiments, the first sub-regions A1 and the second sub-regions A2 may be alternately arranged in the second direction y, and one pixel region may include one first sub-region A1 and one second sub-region A2.

In certain other embodiments, the first sub-regions A1 and the second sub-region A2s may be alternately arranged in the first direction x, and may be located in one pixel region. Further, the number of the first sub-regions and the number of the second sub-regions in one pixel region may vary. One pixel region may comprise only one first sub-region and one second sub-region, or several first sub-regions and several second sub-regions alternately arranged in the row direction and column direction of the matrix respectively.

As shown in FIG. 2b and FIG. 1c, in an LCD panel consistent with the disclosed embodiments, the first organic film layer 106 may include a region 1061 in the first sub-region A1, which may have a first polarization axis d1. The second organic film layer 206 may include a region 2061 in the first sub-region A1, which may have a second polarization axis d2. The first polarization axis d1 may be perpendicular to the second polarization axis d2. The angle between the first polarization axis d1 and the second polarization axis d2 is α, particularly, α=90°.

The first organic film layer 106 may include a region 1062 in the second sub-region A2, which may have a third polarization axis d3. The second organic film layer 206 may include a region 2062 in the second sub-region A2, which may have a fourth polarization axis d4. The third polarization axis d3 may be perpendicular to the fourth polarization axis d4. The angle between the third polarization axis d3 and the fourth polarization axis d4 is β, particularly, β=90°.

Further, in the disclosed embodiments, the first alignment layer 110 may include a region 1101 in the first sub-region A1, which may have a first alignment direction OR1. The second alignment layer 210 may include a region 2101 in the first sub-region A1, which may have a first alignment direction OR1. The first alignment direction OR1 may be parallel to the first polarization axis d1. The angle between the first alignment OR1 and the first polarization axis d1 is γ, particularly, γ=0°.

Further, the first alignment layer 110 may include a region 1102 in the second sub-region A2, which may have a second alignment direction OR2. The second alignment layer 210 may include a region 2102 in the second sub-region A2, which may have a second alignment direction OR2. The second alignment direction OR2 may be parallel to the third polarization axis d3. The angle between the second alignment OR2 and the third polarization axis d3 is δ, particularly, δ=0°.

In the LCD panel consistent with the disclosed embodiments, the alignment direction of the alignment layer in the first sub-regions A1 may be different from the alignment direction of the alignment layer in the second sub-regions A2. And the polarization axis of the organic film layer in the first sub-regions A1 may be different from the polarization axis of the organic film layer in the second sub-regions A2. Therefore, at different viewing angles, images compensated by the first sub-regions A1 and the second sub-regions A2 may be observed. The viewing angles may be compensated in different directions without the limitation of the electrode shape and the viewing angles may be widened.

Further, since the first sub-regions A1 and the second sub-regions A2 may be alternately arranged along the row direction of the matrix and the column direction of the matrix respectively, when viewing at the row direction of the matrix (i.e. the first direction x) or the column direction of the matrix (i.e. the second direction y), a compensation of viewing angle and brightness from the first direction x and the second direction y may be obtained. More uniform images may be obtained and the image quality may be improved.

In the LCD panel consistent with the disclosed embodiments, the alignment direction of the alignment layer in the first sub-regions may be different from the alignment direction of the alignment layer in the second sub-regions. And the polarization axis of the organic film layer in the first sub-regions may be different from the polarization axis of the organic film layer in the second sub-regions. Therefore, the viewing angles may be compensated in different directions without the limitation of the electrode shape and the transmittance may be increased.

Further, because the first sub-regions and the second sub-regions may be alternately arranged along the row direction of the matrix and the column direction of the matrix respectively, viewing angle and brightness may be compensated in the row direction of the matrix and the column direction may be obtained. More uniform images may be obtained and the image quality may be improved.

Due to the polarization effect of the organic film layer, additional polarizers may be avoided and the thickness of the LCD panel may be reduced. Since a same photomask and grating are employed in the fabrication of the alignment layers and the organic film layers, the fabrication process may be simplified without extra cost.

Figure 3:
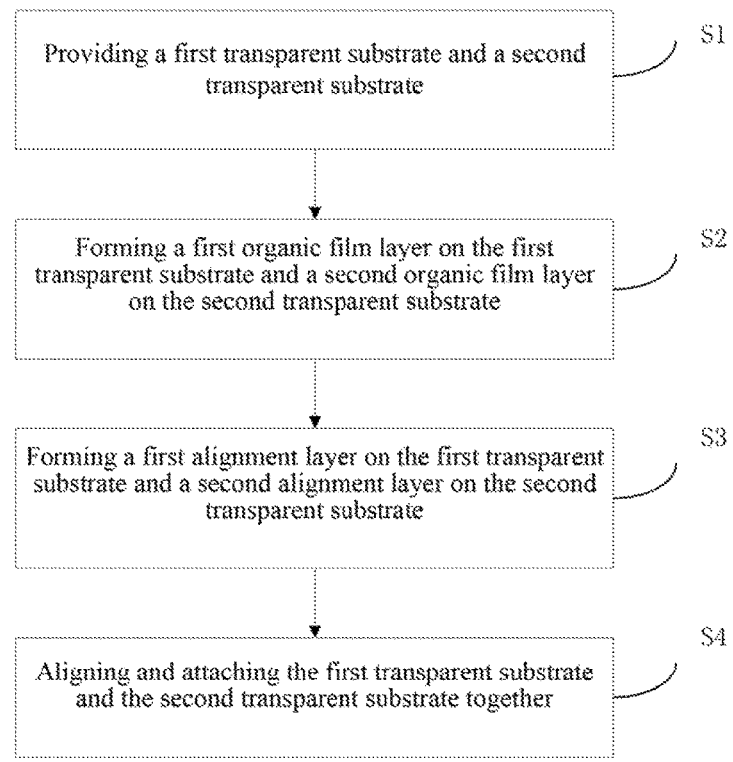
FIG. 3 illustrates a flow chart of an exemplary LCD panel fabrication process consistent with disclosed embodiments.

FIG. 3 illustrates a flow chart of an exemplary LCD panel fabrication process consistent with the disclosed embodiments. FIG. 4a-4j illustrate cross-sectional views of an exemplary LCD panel fabrication process in FIG. 3 consistent with the disclosed embodiments.

Figure 4A:
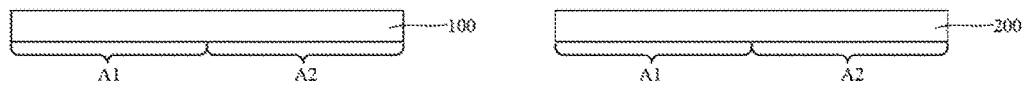
FIG. 4a-4j illustrate cross-sectional views of an exemplary LCD panel during certain stages of the fabrication process in FIG. 3 consistent with disclosed embodiments.

As shown in FIG. 3, at the beginning of the LCD panel fabrication process, a first transparent substrate and a second transparent substrate are provided (S1). FIG. 4a illustrates a cross-sectional view of a corresponding structure.

As shown in FIG. 4a, a first transparent substrate 100 and a second transparent substrate 200 are provided. The first transparent substrate 100 and the second transparent substrate 200 may include a plurality of sub-regions arranged in a matrix. Row direction and column direction of the matrix may be defined as the first direction x and the second direction y, respectively. The first direction x may be perpendicular to the second direction y.

First sub-regions A1 and second sub-regions A2 may be alternately arranged in the row direction of the matrix and the column direction of the matrix, respectively, that is, the first sub-region A1 and the second sub-region A2 may be alternately arranged in the first direction x and the second direction y, respectively. The first sub-regions A1 and second sub-regions A2 alternate over a period of one sub-region in the first direction x. The first sub-regions A1 and second sub-regions A2 alternate over a period of one sub-region in the second direction y.

Further, the first sub-regions A1 on the first transparent substrate 100 may be one-to-one corresponding to the first sub-regions A1 on the second transparent substrate 200. The second sub-region A2 on the first transparent substrate 100 may be one-to-one corresponding to the second sub-region A2 on the second transparent substrate 200.

Returning to FIG. 3, after providing the first transparent substrate and the second transparent substrate, a first organic film layer is formed on the first transparent substrate and a second organic film layer is formed on the second transparent substrate (S2). FIGS. 4b-4e illustrate cross-sectional views of a corresponding structure.

Figure 4B:
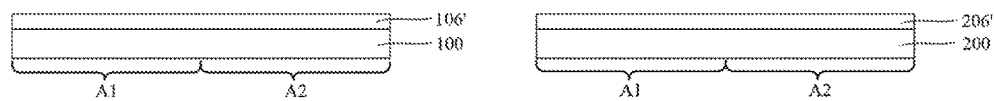

As shown in FIG. 4b, a first organic layer 106' may be formed on the first transparent substrate 100, and the first organic layer 106' may comprise polyimide precursors doped with dichroic organic dyes. A second organic layer 206' may be formed on the second transparent substrate 200, and the second organic layer 206' may comprise polyimide precursors doped with dichroic organic dyes.

In the disclosed embodiments, the dichroic organic dyes contained in the first organic layer 106' and the second organic layer 206' may be azo dyes with an extinction ratio larger than 7. An azo dye molecular exhibits a different light absorption in long axis and short axis, and the light absorption ratio between the long-axis and the short-axis may be larger than 7.

Figure 4C:
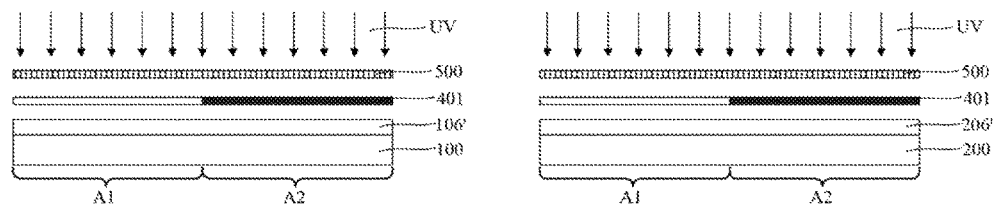
Figure 4D:
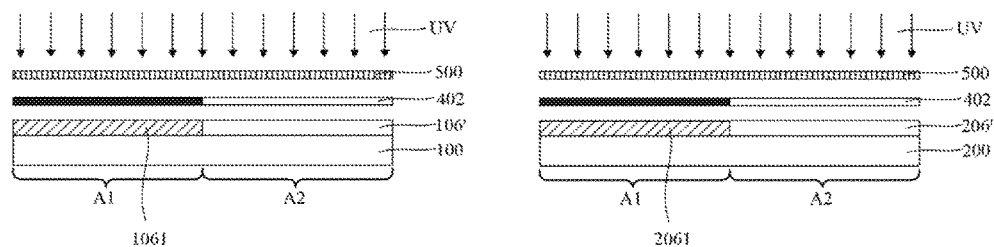

As show in FIG. 4c, the first organic layer 106' is exposed to ultraviolet (UV) light. As show in FIG. 4d the second organic layer 206' is exposed to ultraviolet (UV) light.

In particular, the ultraviolet (UV) light may transmit through a grating 500 and a first photomask 401 successively, and then illuminate the first organic layer 106' and the second organic layer 206'. The grating 500 may be a slit metal grating having multiple slits with a fixed direction. After transmitted through the slits in the grating 500, the UV light may become a polarized UV light having a polarization direction along the direction of the slits in the grating 500.

A first photomask 401 may include at least first opaque region and at least one first transparent region. The first transparent region may be one-to-one corresponding to the first sub-regions A1 on the first transparent substrate 100. The UV polarized may illuminates the first organic layer 106' in the first sub-regions A1 on the first transparent substrate 100 after transmitted through the first photomask 401.

Since the polyimide precursors is photo-sensitive, under the UV exposure, the molecules main chains parallel to the polarization direction may be broken apart, while the molecules main chains perpendicular to the polarization direction may be not affected. The formed polyimide may comprise molecules having long chains perpendicular to the polarization direction. The formed polyimide base may be aligned in a certain direction, and the azo dyes may be induced to align with the alignment direction of the polyimide base.

Because the azo dyes are dichroic, a region 1061 of the first organic film layer on the first sub-region A1 may exhibit a different absorption and transmission for the light polarized in different directions, i.e., a polarization effect. The polarization direction of the light transmitted through the first organic film layer is the polarization axis of the organic film layer.

Similarly, since the first sub-regions A1 on the second transparent substrate 200 are one-to-one corresponding to the first sub-regions A1 on the first transparent substrate 100, a region 2061 of the second organic layer 206' in the first sub-region A1 may exhibit a polarization effect after illuminating UV light transmitted through the same grating 500 and the first photomask 401.

After completing the UV exposure of the first sub-regions A1 on the first transparent substrate 100 and the first sub-regions A1 on the second transparent substrate 200, the UV exposure of the second sub-regions A2 on the first transparent substrate 100 and the second sub-regions A2 on the second transparent substrate 200 may be also carried out. The part 1062 of the first organic film layer in the second sub-region A2 and the part 2062 of the second organic film layer in the second sub-region A2 may exhibit a polarization effect.

The UV light may transmit through the grating 500 and a second photomask 401 successively. The second photomask 402 may include at least one second opaque region and at least one second transparent region. The second transparent regions may be one-to-one corresponding to the second sub-regions A1 on the first transparent substrate 100. The second transparent regions may be one-to-one corresponding to the second sub-regions A1 on the second transparent substrate 200.

It should be noted that, since the same grating 500 may be employed for the UV exposure of the first sub-regions A1 and the second sub-regions A2, the UV light passing the grating 500 may have the same polarization direction. To get a different polarization direction for the organic film layer in the first sub-region A1 and the organic film layer in the second sub-region A2, respectively, the first transparent substrate 100 and the second transparent 200 may need to be rotated.

Therefore, the first sub-regions A1 and the second sub-regions A2 on the first transparent substrate 100 may have a different angle with respect to the polarization direction of the UV polarized light. The first sub-regions A1 and the second sub-regions A2 on the second transparent substrate 200 may have a different angle with respect to the polarization direction of the UV polarized light.

It should be noted, in the disclosed embodiments, the UV light may firstly illuminate the first sub-regions, and then illuminate the second sub-regions. In practical fabrication process, the UV light may firstly illuminate the second sub-regions, and then illuminate the first sub-regions.

Further, the scanning lines, the data lines, the semiconductor layer and a multiple of insulating layers may be formed on the first transparent substrate 100 before the first organic film layer 106. Meanwhile, the black matrix and the color filtering layer may be formed on the second transparent substrate 200 before the second organic layer 206'.

Further, the UV light may pass the grating and the photomask successively, and then illuminates the organic film layers. In certain other embodiments, a multi-axis grating may be adopted. The multi-axis grating may be divided into different regions, and slits in different regions may have a different direction. After passing through the multi-axis grating, a multi-axis linearly polarized UV light may be obtained. The multi-axis linearly polarized UV light may have a different polarization direction in the different regions of the grating.

When using the multi-axis grating, the photomask may be removed and the substrates may not need to be rotated. Different regions in the organics layers may be directly exposed to the polarized UV light. Productivity may be improved and the possible side effects caused by the substrates rotation may be reduced.

Figure 4E:
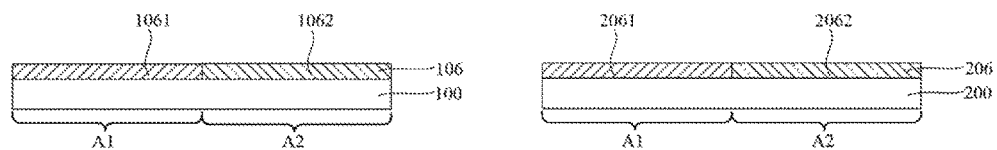

As shown in FIG. 4e, the first organic film layer is formed by illuminating the UV polarized light on the first organic layer 106', and the second organic film layer is formed by illuminating the UV polarized light on the second organic layer 206'. FIG. 4e illustrates a cross-sectional view of the first organic film layer 106 formed on the first transparent substrate 100 and the second organic film layer 206 formed on the second transparent substrate 200.

The first organic film layer 106 and the second organic film layer 206 may include polyimide doped with dichroic organic dyes. The first transparent substrate 100 and the second transparent substrate 200 may be rotated to have an angle with the incident UV polarized light. The first sub-regions A1 in the first organic film layer 106 and the second sub-regions A2 in the first organic film layer 106 may have a different polarization axis, the first sub-regions A1 in the first organic film layer 206 and the second sub-regions A2 in the second organic film layer 206 may have a different polarization axis.

Further, a region 1061 of the first organic film layer 106 in the first sub-region A1 may have a first polarization axis, and a region 2061 of the second organic film layer 206 in the first sub-region A1 may have a second polarization axis. The first polarization axis may be perpendicular to the second polarization axis, that is, angle between the first polarization axis and the second polarization axis is α, particularly, α=90°.

The part 1062 of the first organic film layer 106 in the second sub-region A2 has a third polarization axis, and the part 2062 of the second organic film layer 206 in the second sub-region A2 has a fourth polarization axis. The third polarization axis may be perpendicular to the fourth polarization axis, that is, angle between the third polarization axis and the fourth polarization axis is β, particularly β=90°. In certain other embodiments, it may be possible for an LCD panel to have 89°≤α≤91°, 89°≤β≤91°, −1°≤γ≤1°, −1°≤δ≤1°, approximately, then the first polarization axis may be approximately perpendicular to the second polarization axis.

In the disclosed embodiments, the first organic film layer and second organic film layer with a polarization effect may replace polarizers in the prior arts, and reduce the polarizer thickness. A TAC (triacetyl cellulose) protection layer and an adhesive layer may be no longer needed. Since stretching may be not required to enable the polarization effect, the possibility of warpage may be reduced and the reliability may be improved.

It should be noted that, in certain embodiments, azo dyes are merely examples for illustrative purposes. In certain other embodiments, one or more dichroic dyes with an extinction ration larger than 7 may be used, such as azo dyes, anthraquinone dyes, biphenyl dyes, triphenyl-dioxazine dyes and derivatives, single and multi-methine dyes, polycyclic dyes and etc.

Further, the organic film layers may be made of polyimide doped with dichroic organic dyes. However, in certain other embodiments, the first organic film and the second organic film may include one or more other polymers doped with dichroic organic dyes, such as polymers with a polymeric azo group, cinnamoyl derivatives, polyimide, and etc. The polymer precursors may be photosensitive, and may align the formed polymer in a certain direction when exposed under a polarized light.

Returning to FIG. 3, further, a first alignment layer is formed on the first transparent substrate and a second alignment layer is formed on the second transparent substrate (S3). FIGS. 4*f*-4*i* illustrate cross-sectional views of a corresponding structure.

Figure 4F:
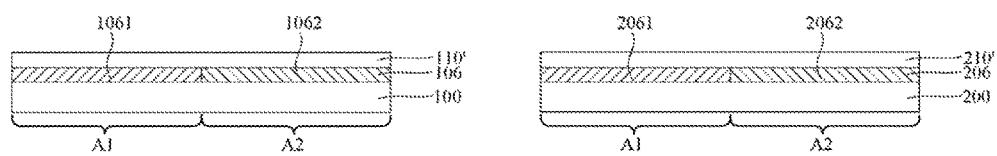

As shown in FIG. 4*f*, a first alignment material layer 110' may be formed on the first transparent substrate 100, and a second alignment material layer 210' may be formed on the second transparent substrate 200. The first alignment material layer 110' and the second alignment material layer 210' comprise polyimide precursors. The polyimide precursors may be aligned in a certain direction when exposing to polarize UV light. The first alignment material layer 110' may be formed on a surface of the first transparent substrate 100 where the first organic film layer 106 may be formed. The second alignment material layer 210' may be formed on a surface of the second transparent substrate 200 where the second organic film layer 206 may be formed.

Figure 4G:
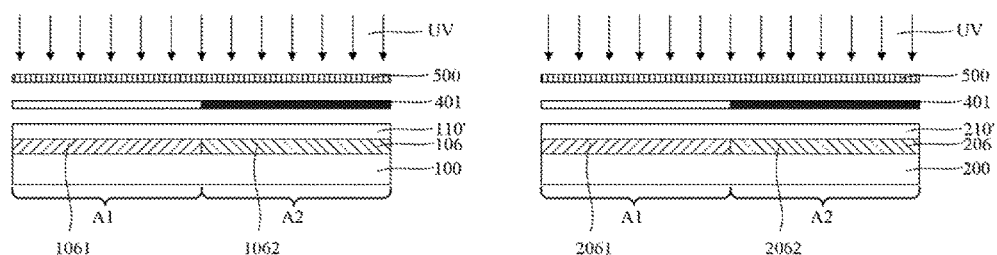
Figure 4H:
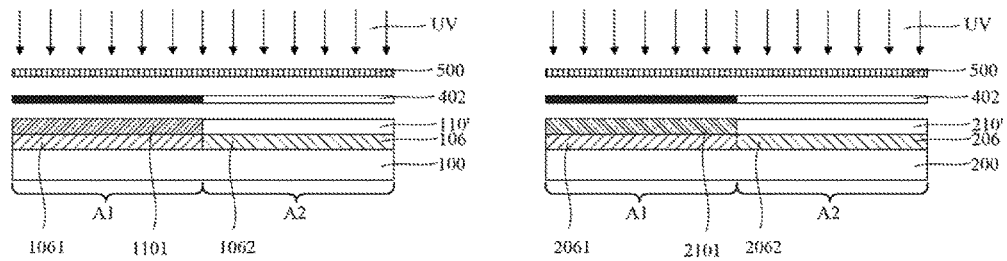

As shown in to FIGS. 4*g* and 4*h*, the first alignment material layer 110' and the second alignment material layer 210' may be exposed to polarized UV light. Similar to the first organic film layer 106 and the second organic film layer 206, the first sub-regions A1 on the first transparent substrate 100 and the first sub-regions A1 on the second transparent substrate 200 may be firstly exposed to UV polarized light. Then the second sub-regions A2 on the first transparent substrate 100 and the second sub-regions A2 on the second transparent substrate 200 may be exposed to UV polarized light.

Since the exposure areas of the alignment material layers and the organic layers may be the same, the grating 500, the first photomask 401 and the second photomask 402 may not need to be covered and changed, and no extra cost may be introduced.

Figure 4I:
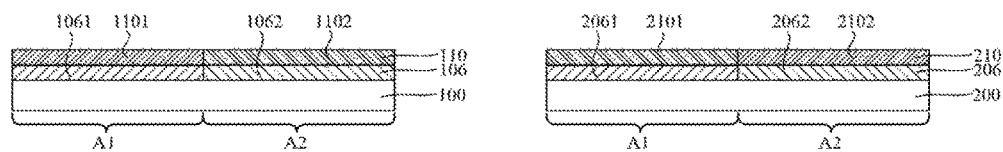

As shown in FIG. 4*i*, similar to the formation of the organic film layers, illuminating the polarized UV light to the first alignment material layer 110' may form a first alignment layer 110, and illuminating the UV polarized light to the second alignment material layer 210' may form a second alignment layer 210.

Because the first alignment material layer 110' may be formed on the surface of the first transparent substrate 100 where the first organic film may be formed, that is, the first organic film layer 106 and the first alignment layer 110 may be formed successively on the same surface of the first transparent substrate 100. It should be noted that, in certain other embodiments, the first organic film layer and the first alignment layer may be formed on a different surface of the first transparent substrate respectively.

Similarly, the second organic film layer 206 and the second alignment layer 210 may be formed successively on the same surface of the second transparent substrate 200. In certain other embodiments, the second organic film layer and the second alignment layer may be formed on a different surface of the second transparent substrate respectively.

During the UV exposure, the first transparent substrate 100 and the second transparent substrate 200 may be rotated to have an angle with the incident UV polarized light. The first alignment layer 110 and the second alignment layer 210 may exhibit a different alignment direction for the first sub-regions A1 and the second sub-regions A2.

Further, a region 1101 of the first alignment layer 110 in the first sub-region A1 may have a first alignment direction, and a region 2101 of the second alignment layer 210 in the first sub-region A1 may also have a first alignment direction. The first alignment direction may be parallel to the first polarization axis, that is, angle between the first alignment and the first polarization axis is $\gamma$, particularly, $\gamma=0°$.

A region 1102 of the first alignment layer 110 in the second sub-region A2 may have a second alignment direction, and a region 2102 of the second alignment layer 210 in the second-domain A2 may also have a second alignment direction. The second alignment direction may be parallel to the third polarization axis, that is, angle between the first alignment and the third polarization axis is $\delta$, particularly, $\delta=0°$.

In the disclosed embodiments, the first alignment direction may be parallel to the first polarization axis. In certain other embodiments the first alignment direction may also be approximately parallel to the second polarization axis, that is, the angle $\gamma$ between the first alignment direction and the first polarization axis/second polarization axis may be $-1°\leq\gamma\leq1°$.

Similarly, in the disclosed embodiment, the second alignment direction may be parallel to the third polarization axis. In certain other embodiments, the second alignment direction may also be approximately parallel to the fourth polarization axis, that is, the angle $\delta$ between the second alignment direction and the third polarization axis/fourth polarization axis may be $-1°\leq\delta\leq1°$.

Further, stripe-shaped electrodes may be formed before forming the first alignment material layer 110' on the first transparent substrate 100. The stripe-shaped electrodes may be pixel electrodes or common electrodes. The stripe-shaped electrodes in the first sub-region A1 and the stripe-shaped electrodes in the second sub-region A2 may extend along the column direction of the matrix including a plurality of the sub-regions.

Further, the stripe-shaped electrodes may be sandwiched between the first organic film layer 106 and the first alignment layer 110, that is, the first organic film layer 106, the stripe-shaped electrodes and the first alignment layer 110 may be formed successively on a surface of the first transparent substrate 100.

Figure 4J:
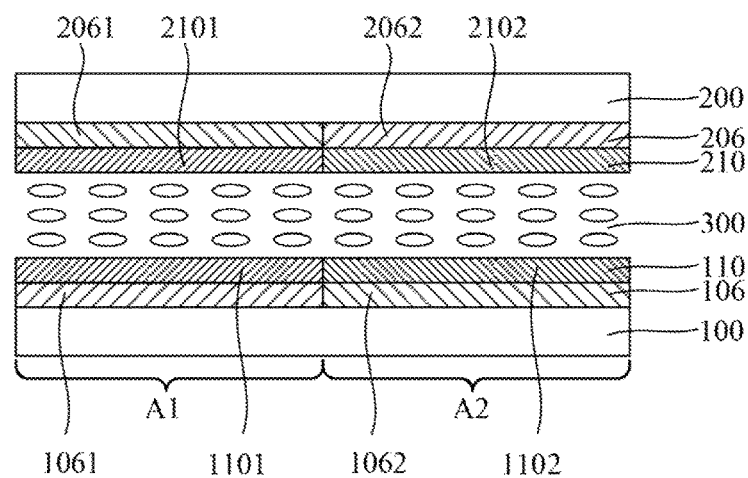

Returning to FIG. 3, after forming the first organic film layer on the first transparent substrate and the second organic film layer on the second transparent substrate, the first transparent substrate and the second transparent substrate are aligned and attached together (S4). FIG. 4*j*-4*e* illustrates a cross-sectional view of a corresponding structure.

As shown in FIG. 4*j*, a liquid crystal layer 300 may be sandwiched between the first transparent substrate 100 and the second transparent substrate 200. The first alignment layer 110 on the first transparent substrate 100 may be facing opposite to the second alignment layer 210 on the second transparent substrate 200. The first transparent substrate and the second transparent substrate may be attached together before filling in the liquid crystal materials.

It should be noted that, in the disclosed embodiments, the first organic film layer on the first transparent substrate and the second organic film layer on the second transparent substrate may be formed simultaneously. Further, the first alignment on the first transparent substrate and the second alignment layer on the second transparent substrate may be formed simultaneously.

However, in the practical fabrication process, the order to form layers on the first transparent substrate and the order to form layers on the second transparent substrate may vary. For example, the first organic film layer and the first alignment layer may be firstly formed on the first transparent substrate. Subsequently, the second organic film layer and the second alignment layer may be formed on the second transparent substrate. Then, the first transparent substrate and the second transparent substrate may be attached together. Or the second organic film layer and the second alignment layer may be firstly formed on the second transparent substrate. Further, the first organic film layer and the first alignment layer may be formed on the first transparent substrate. Further, the first transparent substrate and the second transparent substrate may be attached together. The order to form the layers on the transparent substrate is merely an example for illustrative purposes and is not intended to limit the scope of the present disclosure.

In the LCD panel consistent with the disclosed embodiments, the alignment direction of the alignment layer in the first sub-regions A1 may be different from the alignment direction of the alignment layer in the second sub-regions A2. And the polarization axis of the organic film layer in the first sub-regions A1 may be different from the polarization axis of the organic film layer in the second sub-regions A2. Therefore, the viewing angles may be compensated in different directions without the limitation of the electrode shape and the transmittance may be increased.

Further, since the first sub-regions and the second sub-regions may be alternately arranged along the row direction of the matrix and the column direction of the matrix respectively, viewing angle and brightness may be compensated in the row direction of the matrix and the column direction may be obtained. More uniform images may be obtained and the image quality may be improved.

Due to the polarization effect of the organic film layer, polarizers may be removed and the thickness of the LCD panel may be reduced. Since a same photomask and grating are employed in the fabrication of the alignment layers and the organic film layers, the fabrication process may be simplified without extra cost.

Further, for illustrative purposes, the first alignment direction and the second alignment direction may be symmetric with respect to the row direction of the matrix. The LCD panel with this structure may have a symmetric viewing angle and good image quality.

In certain other embodiments, the first alignment direction and the second alignment direction may be asymmetric with respect to the row direction of the matrix. In the asymmetric structure, the stripe-shaped electrodes may be set to be asymmetric with respect to the row direction of the matrix. The angle between the first alignment direction and the stripe-shaped electrodes in the first sub-regions A1 may be the same as the angle between the second alignment and the stripe-shaped electrodes in the second sub-regions A2. Under a same driving voltage, liquid crystal molecules in the first sub-regions A1 and the second sub-regions A2 may be rotated by a same angle, and may not result a non-uniform image. In the LCD panel with an asymmetric design, the viewing angle may be compensated in different viewing directions, in order to meet various requirements of the viewing angle.

Other applications, advantages, alternations, modifications, or equivalents to the disclosed embodiments may be obvious to those skilled in the art. It may be intended that the specification and embodiments be considered as exemplary only, with a true scope and spirit of the invention being indicated by the claims.

What is claimed is:

1. A liquid crystal display (LCD) panel, comprising:
a first transparent substrate;
a second transparent substrate arranged opposite to the first transparent substrate;
a plurality of sub-regions arranged in a matrix, including at least one first sub-region and at least one second sub-region;
a first organic film layer formed on the first transparent substrate and a second organic film layer formed on the second transparent substrate;
a first alignment layer formed on the first transparent substrate and a second alignment layer formed on the second transparent substrate, wherein the first alignment layer is facing the second alignment layer;
a liquid crystal layer sandwiched between the first transparent substrate and the second transparent substrate;
a plurality of scanning lines and a plurality of data lines formed on the first transparent substrate or the second transparent substrate, wherein the scanning lines intersect with the data lines, defining a plurality of pixel regions;
a switching element placed close to an intersection of a scanning line and a data line; and
a plurality of pixel electrodes and a plurality of common electrodes formed in the pixel regions, wherein a pixel electrode or a common electrode includes a plurality of stripe-shaped electrodes,
wherein:
all the stripe-shaped electrodes disposed in a same pixel region extend along a same direction,
the first organic film layer has a first polarization axis in the at least one first sub-region, the second organic film layer has a second polarization axis in the at least one first sub-region, the first polarization axis has an angle α with the second polarization axis, wherein $89° \leq \alpha \leq 91°$,
the first organic film layer has a third polarization axis in the at least one second sub-region, and the second organic film layer has a fourth polarization axis in the at least one second sub-region,
the third polarization axis is different from the first third polarization axis, and the fourth polarization axis is different from the second polarization axis,
the first alignment layer and the second alignment layer both have a first alignment direction in the at least one first sub-region, and both have a second alignment direction in the at least one second sub-region,
the second alignment direction in the at least one second sub-region is different from the first alignment direction in the at least one first sub-region.

2. The LCD panel according to claim 1, wherein:
the third polarization axis has an angle β with the fourth polarization axis, wherein $89° \leq \beta \leq 91°$;

the first alignment direction has an angle γ with the first polarization axis/second polarization axis, wherein −1°≤γ≤1°; and the second alignment direction has an angle δ with the third polarization axis/fourth polarization axis, wherein −1°≤δ≤1°.

3. The LCD panel according to claim 2, wherein:
the first alignment direction and the second alignment direction are symmetric with respect to a row direction of the matrix or a column direction of the matrix.

4. The LCD panel according to claim 2, wherein:
a number of the at least one first sub-region is equal to a number of the at least one second sub-region.

5. The LCD panel according to claim 2, wherein:
the at least one first sub-region and the at least one second sub-region are alternately arranged along a row direction of the matrix.

6. The LCD panel according to claim 5, wherein:
the at least one first sub-region and the at least one second sub-region are alternately arranged along a column direction of the matrix.

7. The LCD panel according to claim 1, wherein:
the at least one first sub-region and the at least one second sub-region are located in the same pixel region.

8. The LCD panel according to claim 1, wherein:
the stripe-shaped electrode in the first sub-region and the stripe-shaped electrode in the second sub-region are symmetric with respect to a row direction or a column direction of the matrix.

9. The LCD panel according to claim 2, wherein:
the first organic film layer is between the first transparent substrate and the first alignment layer, and the second organic film layer is between the second transparent substrate and the second alignment layer.

10. The LCD panel according to claim 2, wherein:
the first organic film layer and the second organic film layer are made of polymers doped with dichroic organic dyes.

11. The LCD panel according to claim 10, wherein:
the polymer is polyimide, and extinction ratio of the dichroic organic dyes is larger than 7.

12. The LCD panel according to claim 1, wherein:
the first alignment direction is not parallel to the second alignment direction.

13. The LCD panel according to claim 9, wherein:
the first organic film layer disposed between the first transparent substrate and the first alignment layer is used simultaneously as a planarization layer and a polarization film, and the second organic film layer disposed between the second transparent substrate and the second alignment is used simultaneously as a planarization layer and a polarization film.

14. The LCD panel according to claim 1, wherein:
the first organic film layer is disposed between a layer containing the data lines and a layer containing the pixel electrodes, and the first organic film layer is used simultaneously as a planarization layer and a polarization film.

* * * * *